United States Patent [19]

Reznik et al.

[11] Patent Number: 5,670,198
[45] Date of Patent: Sep. 23, 1997

[54] METHOD FOR RAPIDLY COOLING LIQUID EGG

[76] Inventors: David Reznik, 2151 Barbara Dr., Palo Alto, Calif. 94303; Aloysius Knipper, 227 Cupsaw Dr., Ringwood, N.J. 07456

[21] Appl. No.: 513,551

[22] Filed: Aug. 10, 1995

Related U.S. Application Data

[62] Division of Ser. No. 401,029, Mar. 8, 1995, Pat. No. 5,533,441, which is a division of Ser. No. 192,457, Feb. 7, 1994, abandoned, which is a division of Ser. No. 862,198, Apr. 2, 1992, Pat. No. 5,290,583.

[51] Int. Cl.$^6$ .......................................... A23L 1/32
[52] U.S. Cl. ........................................ 426/614; 426/524
[58] Field of Search ............................. 426/614, 524

[56] References Cited

U.S. PATENT DOCUMENTS

| 535,267 | 3/1895 | Wagner et al. |
| 684,746 | 10/1901 | Chapman. |
| 731,339 | 6/1903 | Chapman. |

(List continued on next page.)

FOREIGN PATENT DOCUMENTS

| 2100618 | 1/1994 | Canada. |
| 0 032 840 | 7/1981 | European Pat. Off. |
| 0 457 179 | 11/1981 | European Pat. Off. |
| 230-978-A | 1/1986 | European Pat. Off. |
| 0 497 099 | 8/1992 | European Pat. Off. |
| 0 685 987 | 12/1995 | European Pat. Off. |
| 2513087 | 3/1983 | France. |
| 945 582 | 7/1956 | Germany. |
| 1 075 570 | 11/1957 | Germany. |
| 47-48542 | 6/1972 | Japan. |
| 24735 | 2/1931 | Netherlands. |
| 639158 | 12/1978 | U.S.S.R. |
| 683034 | 8/1979 | U.S.S.R. |
| 895141 | 5/1962 | United Kingdom. |
| 904371 | 8/1962 | United Kingdom. |
| 2068200 | 8/1981 | United Kingdom. |
| 2140668 | 12/1984 | United Kingdom. |
| 2 147 776 | 5/1985 | United Kingdom. |
| 2 164 732 | 3/1986 | United Kingdom. |
| 2 282 052 | 3/1995 | United Kingdom. |
| WO8900384 | 1/1989 | WIPO. |
| WO9015547 | 12/1990 | WIPO. |
| WO9319620 | 10/1993 | WIPO. |
| WO94/11681 | 5/1994 | WIPO. |
| WO94/18845 | 9/1994 | WIPO. |
| WO95/10943 | 4/1995 | WIPO. |

OTHER PUBLICATIONS

Palaniappan, S. et al., "Effects of Electricity on Microorganisms: A review," Journal of Food Processing and Preservation vol. 14, No. 5 (Oct., 1990), pp. 383–414.

Palaniappan, S. et al., "Experimental Studies on Electroconductive (Ohmic) Heating of Liquids," prepared for an American Society of Agricultural Engineers Meeting Presentation (Dec. 12–15, 1989), Paper No. 89–6553.

Parrott, D. L. et al., "The Aseptic Processing of Fluids Containing Particulates from 1/8" to 1" size," prepared for presentation at American Institution of Chemical Engineers 1988 Summer Meeting (Aug. 21–24, 1988) (Unpublished), Paper No. 60e.

Parrott, D. L., "Use of Ohmic Heating for Aseptic Processing of Food Particulates," Food Technology (Dec., 1992), pp. 68–72.

Reznik, D., "Electroheating," Dec., 1989.

Sastry, S. K., "A Model for Heating Liquid–Particle Mixtures in a Continuous Flow Ohmic Heater," Journal of Food Process Engineering 15 (1992), pp. 263–278.

(List continued on next page.)

Primary Examiner—Anthony J. Weier
Attorney, Agent, or Firm—Fish & Neave; Jeffrey H. Ingerman

[57] ABSTRACT

Provided herein is a method for electroheating liquid egg. Also provided herein is an apparatus specifically designed for heating and cooling materials and preferably liquid egg and apparatus for pasteurizing liquid egg by electroheating.

3 Claims, 4 Drawing Sheets

U.S. PATENT DOCUMENTS

| | | |
|---|---|---|
| 1,147,558 | 7/1915 | Shelmerdine . |
| 1,360,447 | 11/1920 | Rudd . |
| 1,431,580 | 10/1922 | Graetzer et al. . |
| 1,522,188 | 1/1925 | Hull . |
| 1,775,579 | 9/1930 | Woodrich . |
| 1,813,064 | 7/1931 | Matzka . |
| 1,934,703 | 11/1933 | Golden . |
| 2,081,243 | 5/1937 | Macy . |
| 2,438,582 | 3/1948 | Southerwick . |
| 2,473,041 | 6/1949 | Urbain et al. . |
| 2,495,415 | 1/1950 | Marshall . |
| 2,510,796 | 6/1950 | Brown . |
| 2,550,584 | 4/1951 | Mittelmann . |
| 2,564,579 | 8/1951 | Parmenter et al. . |
| 2,565,311 | 8/1951 | Koonz et al. . |
| 2,582,281 | 1/1952 | Robertson . |
| 2,585,970 | 2/1952 | Shaw . |
| 2,685,833 | 8/1954 | Hagopian . |
| 2,799,216 | 7/1957 | Coulter . |
| 2,838,640 | 6/1958 | Mann et al. . |
| 3,315,681 | 4/1967 | Poppendiek . |
| 3,753,886 | 8/1973 | Myers . |
| 3,867,610 | 2/1975 | Quaintance . |
| 3,877,360 | 4/1975 | Vigerstrom . |
| 3,949,099 | 4/1976 | Kaufman . |
| 4,091,119 | 5/1978 | Bach . |
| 4,109,566 | 8/1978 | Vigerstrom . |
| 4,177,719 | 12/1979 | Balaguer . |
| 4,211,887 | 7/1980 | Williamson ............................ 13/6 |
| 4,369,351 | 1/1983 | Massey et al. ........................ 219/284 |
| 4,378,846 | 4/1983 | Brock .................................... 166/303 |
| 4,409,249 | 10/1983 | Forkner ................................ 426/100 |
| 4,417,132 | 11/1983 | Simpson . |
| 4,420,382 | 12/1983 | Riedl . |
| 4,434,357 | 2/1984 | Simpson et al. . |
| 4,457,221 | 7/1984 | Geren . |
| 4,496,594 | 1/1985 | Miyahara . |
| 4,522,834 | 6/1985 | Miyahara . |
| 4,524,079 | 6/1985 | Hofmann . |
| 4,695,472 | 9/1987 | Dunn et al. . |
| 4,723,483 | 2/1988 | Papchenko et al. . |
| 4,739,140 | 4/1988 | Reznik . |
| 4,808,425 | 2/1989 | Swartzel et al. . |
| 4,838,154 | 6/1989 | Dunn et al. . |
| 4,853,238 | 8/1989 | Huang . |
| 4,857,343 | 8/1989 | Hekal ................................... 426/239 |
| 4,871,559 | 10/1989 | Dunn et al. . |
| 4,957,759 | 9/1990 | Swartzel et al. . |
| 4,957,760 | 9/1990 | Swartzel et al. . |
| 4,959,525 | 9/1990 | Stirling et al. . |
| 4,971,827 | 11/1990 | Huang . |
| 4,994,291 | 2/1991 | Swartzel et al. . |
| 5,019,407 | 5/1991 | Swartzel et al. . |
| 5,019,408 | 5/1991 | Swartzel et al. . |
| 5,048,404 | 9/1991 | Bushnell et al. . |
| 5,084,153 | 1/1992 | Mosse et al. . |
| 5,085,882 | 2/1992 | Rausing . |
| 5,091,152 | 2/1992 | Thomas, Sr. . |
| 5,105,724 | 4/1992 | Swartzel et al. . |
| 5,167,976 | 12/1992 | Papetti . |
| 5,226,106 | 7/1993 | Stirling . |
| 5,235,905 | 8/1993 | Bushnell et al. . |
| 5,266,338 | 11/1993 | Cascione et al. . |
| 5,288,471 | 2/1994 | Corner . |
| 5,290,583 | 3/1994 | Reznik et al. . |
| 5,326,530 | 7/1994 | Bridges . |
| 5,415,882 | 5/1995 | Knipper et al. ...................... 426/237 |
| 5,514,391 | 5/1996 | Bushnell et al. ..................... 426/237 |

OTHER PUBLICATIONS

Sastry, S. K. et al., "Mathematical Modeling and Experimental Studies on Ohmic Heating of Liquid–Particle Mixtures in a Static Heater," Journal of Food Process Engineering 15 (1992), pp. 241–261.

Sastry, S. K. et al., "Ohmic Heating of Liquid–Particle Mixtures," Food Technology (Dec., 1992), pp. 64–67.

Alkskog, L., "High Temperature pasteurization of Liquid Whole Egg," Process Technology, pp. 16–18.

Hamid–Samimi, M. H. et al., "Aseptic Packaging of Ultrapasteurized Egg, Design and Economic Considerations," publication date unknown, but a copy was transmitted to Mr. Merle Kirk under cover of a letter dated Aug. 21, 1985 from Prof. Hersell Ball, Jr.

Hanson et al., "Pasteurization Of Liquid Egg Products," Received for publication Nov. 16, 1946 pp. 277–283.

Madsen, M., "Pasteurizing of Egg Products," Sundhedsplejen (Dec., 1958), 102–105 and translation thereof.

Murdock et al., "The Pasteurization Of Liquid Whole Egg," issued from the Office of Medical Research Council, 38, Old Queen Street, Westminster, S.W.I.

Russell, M. J., "Live Long and Prosper," Food Engineering, Dec., 1992, pp. 77–80.

Winter et al., "Pasteurization of Liquid–Egg Products. I. Bacteria Reduction in Liquid Whole Egg and Improvement in Keeping Quality," Journal Paper No. J–1300 of the Town Agricultural Experimental Station, received from publication on Jun. 18, 1945, 229–245.

Winter et al., "Pasteurization of Liquid Egg Products III. Destruction of Salmonella in Liquid Whole Egg," American Journal of Public Health, vol. 36,), pp. 451–460 (1946).

"Annual Report of Cooperative Regional Projects" Supported by Allotment of the Regional Fund, Hatch Act, as Amended Aug. 11, 1955, Jan. 1 to Dec. 31, 1984, Raleigh, North Carolina. Approved by Chairman Hershell Ball, Jr. on Mar. 14, 1985.

Ball, H. R. Jr. et al., "Function and Shelf Life on Ultrapasteurized, Aseptically packaged Whole Egg" Abstract, Poultry Science Association Annual Meeting—Jul. 29–Aug. 2, 1985, Iowa State University, Ames.

Dinnage, D. F., "Continuous Aseptic Processing Using the Ohmic Heating Process," CHanging Food Technology 3, Food Technology: A view of the Future (Selected Papers from the Sixth Eastern Food Science & Technology Conference), Edited by Allen Freed (1990), pp. 29–41.

Essary, E. O. et al., "New Uses of Heated Aseptically Packaged Fluid Egg Products," Departments of Food Science and Technology, and Chemical Engineering, Virginia Polytechnic Institute and State University, Blacksburg, VA, 1983.

Hamid–Samimi, M. H., "Criteria Development for Extended Shelf–Life Pasteurized Liquid Whole Egg," Ph.D. Thesis, North Carolina State University, Raleigh, North Carolina, 1984.

Jacobs, L. C., "Aseptic packaging promises new role for pasteurized liquid eggs," Apr., 1981.

Sill, M., "NCSU researchers crack the secret of long shelflife for eggs," The News and Observer, Raleigh, North Carolina, Sep. 3, 1985.

Stone, W. K. et al., "Aseptic Processing of Liquid Eggs Pasteurized in a Teflon Heat Exchanger," 1983.

METHOD FOR RAPIDLY COOLING LIQUID EGG

CROSS REFERENCE TO RELATED APPLICATIONS

This application is a division of U.S. patent application Ser. No. 08/401,029, filed Mar. 8, 1995, now U.S. Pat. No. 5,533,441, which is a division of U.S. patent application Ser. No. 08/192,457, filed Feb. 7, 1994, now abandoned, which is a division of U.S. patent application Ser. No. 07/862,198, filed Apr. 2, 1992, now U.S. Pat. No. 5,290,583.

FIELD OF THE INVENTION

The present invention relates to methods and apparatus for electroheating, processing, pasteurizing, and/or cooking liquid egg.

BACKGROUND OF THE INVENTION

There are a number of techniques which are known for pasteurizing and processing liquid egg. The more popular approaches involve the use of conventional plate heat exchangers, steam infusion systems, or combinations of both. However, these techniques have limitations because of the physical nature of liquid egg. Plate heat exchangers are very popular in that they are very efficient and relatively simple to use. However, plate heat exchangers are limited in the amount of heat that they can convey to liquid eggs without causing irreparable harm such as undue coagulation, scorching, caking on the plate, and the like. Furthermore, the highest effective temperature range over which heating can be accomplished by plate heat exchangers is limited to between about 150° F. to about 155° F., particularly for long term, continuous processing techniques. As a matter of practical reality, plate heat exchangers can only be used to heat liquid whole egg to pasteurization temperatures of between about 140° F. and about 155° F. for an extended period of time.

Steam infusion systems can be used to obtain much higher temperatures such as, for example, 165° F. However, it is necessary to separate the condensed steam and residual water from the liquid egg during processing. The equipment used for steam pasteurizing liquid eggs is also quite expensive and elaborate.

It is of course possible to pasteurize at lower temperatures without the attendant shortcomings of high temperature methodologies. However, in so doing, sacrifices are made in terms of the degree of microbial kill and extent of the storage stability of the resulting liquid egg product.

Electroheating has been used successfully for the heat treatment, and principally the cooking, of food stuffs. A particularly important technique for electroheating is described by Mr. David Reznik, (a co-inventor hereof) in U.S. Pat. No. 4,739,140, the entirety of which is hereby incorporated by reference. Mr. Reznik found that when an AC electric current at a frequency exceeding mains frequency is passed through food, heating of the food can be accomplished without substantial electrolysis or reaction between the food product and the electrodes.

Mr. Reznik's U.S. Pat. No. '140 patent does not describe, however, pasteurizing egg. Furthermore, this important work does not discuss any of the unique qualities or unique problems associated with the continuous pasteurization of liquid egg. Liquid egg is unique and when considering its preparation, processing and/or storage a number of often competing criteria must be taken into account, including, without limitation: storage stability, content of potentially pathogenic bacteria, foaming ability, emulsion properties, viscosity, detrimental coagulation, and pourability. Largely because of this complexity and because of practical commercial considerations, the application of Mr. Reznik's original discovery to continuous liquid egg pasteurization was not without difficulty. Originally, such problems as caking on one or the other electrode (particularly at low frequency), detrimental coagulation, odor, and arcing, were observed. The reasons for these problems are not yet completely understood. However, the interplay of the demands of regulatory oversight, commercial desirability, the qualities and properties of liquid egg, and the physical constraints of the original electroheating apparatus design are most likely responsible.

U.S. Pat. No. 4,695,472, (the U.S. Pat. No. "'472 patent") discusses methods and apparatus for extending the shelf life of fluid food products including eggs. The methods and apparatus described involve the repeated application of high voltage, high current density, discrete electric pulses to fluid food products. Field strengths used, are, at a minimum, 5,000 volts/cm, voltages as high as, for example, 37,128 volts are disclosed. Current densities of at least about 12 amps/cm$^2$ are also disclosed as are pulse frequencies of between 0.1 and 100 Hz. Preferably, the treatment methods according to the U.S. Pat. No. '472 patent involves the application of at least 2 and more preferably at least about 5 high energy pulses to the material being treated. The principal embodiments disclosed in the U.S. Pat. No. '472 patent involve the use of direct current. The techniques described in the U.S. Pat. No. '472 patent have several disadvantages. Most notably, electrolysis is caused with resultant electrode loss, contamination, and, at least in the case of eggs, detrimental coagulation. To mitigate this problem, the U.S. Pat. No. '472 patent requires the use of membranes interposed between the electrodes and the food product being treated. The U.S. Pat. No. '472 patent also fails to appreciate that highly functional egg having outstanding storage stability can be obtained without the need for the complicated pulsed electrical treatment disclosed therein.

Most importantly, the U.S. Pat. No. '472 reference does not appreciate the difficulties attendant the continuous pasteurization of liquid egg. Specifically, nothing in the U.S. Pat. No. '472 patent discusses the problems attendant ensuring the absence of detrimental coagulation. Most notably, even though the U.S. Pat. No. '472 patent does describe arcing as a potential problem, the only effect attributed to such arcing is damage to the electrodes. Furthermore, all of the tests conducted in accordance with the U.S. Pat. No. '472 patent of liquid egg involve the use of static, bench testing devices at peak voltages of 34,000 volts or higher and currents ranging from between 7,200 and 14,200 amps. No continuous egg processing was undertaken. As will be described further herein, when similar static testing was undertaken by the present inventors using the technology described herein, totally coagulated egg resulted.

To date, the U.S. Pat. No. '472 patent has, apparently, not been the subject of commercial use nor are the present inventor(s) aware of any egg product being produced in accordance with its teaching. Thus, whether or not a sufficiently functional egg product can be produced with such methodologies and apparatus is unknown.

OBJECTS AND SUMMARY OF THE INVENTION

One object of the present invention is to provide methods of pasteurizing liquid egg at temperatures which would not otherwise be conveniently achievable, particularly using plate heat exchangers.

It is another object of the present invention to provide methods of heating liquid egg to eliminate pathogens bacteria and decrease the number of pathogenic and spoilage microorganisms which exist in liquid egg, without sacrificing the physical characteristics of the liquid egg.

It is another object of the present invention to provide methods of pasteurizing liquid egg which can be integrated into existing pasteurization equipment with only modest modifications thereto.

In accordance with the present invention and these objects, there is provided a method of pasteurizing liquid egg which includes providing liquid egg and electroheating the liquid egg using electric current having a frequency which is effective to heat the liquid egg without electrolysis. Electroheating of said liquid egg is conducted so as to avoid detrimental coagulation. The electroheated liquid egg is held for a period of time which is sufficient to achieve pasteurization. The electroheated liquid egg is then cooled. Thereafter, the electroheated pasteurized liquid egg can be packaged, or can be stored in a conventional manner.

The pasteurized electroheated liquid egg just described, unexpectedly has a degree of microbial kill which is greater than that which could be expected from the use of a plate heat exchanger, under the same time and temperature conditions. In a preferred embodiment in accordance with the present invention, there is provided a method of pasteurizing liquid egg which includes providing preheated liquid egg at a temperature of from about 125° F. to about 144° F. and electroheating the liquid egg to a temperature of from about 150° F. to about 165° F. Thereafter the electroheated liquid egg is held for a period of between about 5 minutes and about 0.5 seconds respectively to accomplish pasteurization. The liquid egg is then cooled and packaged.

In another preferred embodiment in accordance with the present invention, there is provided a method of pasteurizing liquid egg which includes providing liquid egg and electroheating the liquid egg, using electric current having a frequency effective to heat said liquid egg without electrolysis. Electroheating is conducted at a rate of between greater than zero and less than about 36° F./sec. and is conducted so as to avoid detrimental coagulation. Thereafter, the electroheated liquid egg is held for a period of time which is sufficient to achieve pasteurization. The electroheated liquid egg is then cooled. In a preferred embodiment, the electroheated liquid egg may also be packaged and preferably aseptically packaged.

It might be that liquid egg can only be heated so fast, regardless of the other factors involved. More likely however, the fact that liquid egg suffers from these problems when electroheating becomes more rapid is due to limitations of the electroheating cell rather an inherent characteristic of liquid egg. Of course, it is preferable to heat liquid egg as quickly as a particular device will allow and begin cooling as soon as possible so as to minimize detrimental coagulation or other heat damage to the liquid egg.

The methods of the present invention have many advantages. Generally higher temperatures can be applied to the liquid egg to achieve pasteurization. This will result in a greater degree of microbial kill increasing not only the safety of the resulting liquid egg, but also the shelf life or storage stability thereof. These benefits are obtained without detrimental coagulation or electrolysis. For example, despite the use of metal electrodes, and principally metal plate electrodes, the electrodes do not impart heat directly to the liquid egg. They are not, therefore, the heating surfaces, rather they are heated by the electroheated liquid egg. Caking and coagulation problems normally associated with the use of plate heat exchangers are eliminated by the use of electroheating in accordance with the methods of the present invention.

Furthermore, higher temperature pasteurization can be achieved without the disadvantages of other high temperature heating techniques such as, for example, the use of steam. Water introduced into the egg in the form of steam will not have to be separated therefrom nor is it necessary to conduct any part of the process under high vacuum conditions. There is neither a need to use complicated and delicate membranes to prevent electrolysis nor a need to use very high energy, high current density electric pulses to achieve a highly effective level of microbial kill.

A number of advantages also inure from the use of electroheating in accordance with the present invention to pasteurize liquid egg. Electroheating provides a very uniform way of heating liquid egg. Heat does not radiate forming a gradient inwardly from hot metallic plates. Instead, the egg is a resistor in the path of electricity traveling between the electrodes and as such, heat is generated internally and substantially homogeneously throughout the egg. The uniformity obtained by such treatments is extremely important in the production of a consistent product.

Furthermore, while not wishing to be bound by a particular theory of operation, it is believed that the passage of electric current through the liquid egg provides a level of microbial kill above and beyond that which could normally be obtained through the use of other heating methods and devices using the same time and temperature conditions. It is believed that at least some of the microbes found in egg are, in effect, electrocuted in accordance with the process of the present invention. This provides for a more effective method of killing bacteria and other microbes. Some of the microbes may be weakened by either the thermal treatment, the electrocution, or both. Then, apparently, instead of recovering from their injured state, these microbes eventually die, furthering the completeness of the pasteurization.

These theories find some support in the U.S. Pat. No. '472 patent. That these theories are applicable to electroheating in accordance with the present invention finds some support in the testing undertaken by the present inventors. Liquid whole egg treated in accordance with the present invention showed a lower rate of re-growth of certain bacteria over time following pasteurization when compared to liquid whole egg pasteurized under identical conditions using a plate heat exchanger. This indicates a more complete microbial kill, greater safety, and greater storage stability, both at refrigerated temperatures and above 40° F.

In addition, certain tests indicate that liquid egg electroheated in accordance with the present invention continued to exhibit a decreasing level of microbes during refrigeration, days and even weeks after pasteurization. It is believed that this phenomena is a result of injured microbes dying.

It is another object of the present invention to provide for methods of reducing the level of spoilage inducing microbes in liquid egg so as to extend the storage stability thereof.

In accordance with this aspect of the present invention, there is provided a method for imparting increased storage stability to liquid egg. The method includes providing liquid egg; electroheating the liquid egg using electric current having a frequency effective to heat said liquid egg without electrolysis so as to avoid detrimental coagulation. This treatment will impart additional kill of spoilage inducing microbes contained in the liquid egg. Finally, the electroheated liquid egg is cooled.

In a preferred embodiment, the above method involves electroheating already pasteurized liquid egg and, in a more preferred embodiment, the liquid egg is electroheated to a temperature which is greater than the temperature used to pasteurize the liquid egg.

Pasteurization of liquid egg kills all of the bacteria posing an immediate health risk contained therein. Pasteurizing liquid egg can, in addition, impart a degree of kill of spoilage microbes or bacteria so as to increase the shelf stability of the resulting product. By the use of the methods of the present invention, liquid egg including already pasteurized liquid egg, is subsequently processed using electroheating to further improve the level of kill of spoilage microbes over and above the level of such kill achieved during pasteurization.

Interestingly, because of the better kill profile achieved using electroheating, it is possible to electroheat already pasteurized liquid egg to a temperature which is lower than that used to achieve pasteurization, and yet still achieve better storage stability. However, it is preferred that the pre-pasteurized egg be further processed by electroheating at a temperature which is in excess of that used to pasteurize the liquid egg. This should provide an even larger degree of kill of spoilage microorganisms.

It is also an object of the present invention to provide an apparatus for pasteurizing liquid egg using electroheating technology.

In accordance with this aspect of the present invention, there is provided an apparatus for pasteurizing liquid egg which includes an electroheating cell. The electroheating cell contains at least one pair of electrodes having egg engaging surfaces spaced apart from one another to form a gap through which liquid egg to be pasteurized is passed. The electroheating cell has a source of high frequency electric current operably linked to the electrodes. A holding chamber or holding tube in fluid communication with the gap for receiving liquid egg flowing through the gap is also provided as is a means for receiving and cooling electroheated liquid egg flowing from said holding chamber.

In a preferred embodiment in accordance with the present invention, the electrodes used in the apparatus are generally parallel plate electrodes having highly smooth, non-wetting surfaces with rounded edges. In a highly preferred embodiment, the electrodes are disposed in an electroheating cell such that the edges of the electrodes do not directly contact liquid egg being processed through the cell.

While not wishing to be bound by any particular theory of operation, it is believed that the metal edges of plate electrodes could provide a source for fluctuations in current density. More importantly, it is possible that at these edges, current density increases and arcing may occur. It is also possible, short of arcing, that the increased current density causes "hot spots" which are detrimental to the overall heating of the liquid egg. Rounding the otherwise sharp metal edges of the electrodes is believed to provide better and more uniform heating. Eliminating the edges entirely by tapering the ends or by encasing or embedding the edges of the electrodes in an insulating material is, however, preferred.

BRIEF DESCRIPTION OF THE DRAWINGS

The preferred embodiments of the present invention will be described in greater detail with reference to the accompanying drawings, wherein like members bear like reference numerals and wherein.

DETAILED DESCRIPTION OF THE PREFERRED EMBODIMENTS

The term liquid egg in accordance with the present invention is meant to include not only liquid egg white and liquid egg yolk, but combinations of each in any predetermined or desirable ratio. The term liquid egg also includes liquid egg white, liquid egg yolk, or combinations thereof (referred to as "liquid whole egg") with additives such as salt, sugar, milk, stabilizers, dextrins, cyclodextrins, peroxides, acids and foodstuffs including solid or particulate foodstuffs. Liquid egg from which cholesterol has been removed is also included.

The term "electroheating" in accordance with the present invention is meant to encompass a process of generating heat in liquid egg by passing a current through the liquid egg. The liquid egg acts as a resistor and heat is generated thereby. A particularly preferred technique for electroheating food is described in U.S. Pat. No. 4,739,140 which has previously been incorporated by reference. In electroheating, the electrodes do not get hot as a result of the flow of current. In fact, in a preferred embodiment, affirmative steps are taken to ensure that the electrodes do not get hot. The only heat used to raise the temperature of the liquid egg is generated within the liquid egg itself.

As used herein, the terms "pasteurization", "pasteurize", and "pasteurized" refer to the killing of sufficient pathogenic microorganisms contained within liquid egg so as to render the liquid egg edible without threat of, for example, salmonella infection. "Pasteurization" may also be thought of as a treatment which is designed to eliminate, for all practical purposes, pathogenic microorganisms and, secondarily, to reduce the number of spoilage microorganisms present to improve the keeping quality of the liquid egg products. At U.S.D.A. minimum time and temperature parameters, pasteurization will generally produce liquid whole egg which will have a refrigerated shelf life of between about 7 and about 14 days (i.e., shelf life means the actual time period that the liquid egg product remains safe to consume).

"Extended refrigerated shelf life" means that the liquid egg is safe to consume for a period of at least 3 weeks after treatment in accordance with the present invention. This, of course, assumes proper refrigerated storage. Preferably, the term "extended refrigerated shelf life" means that the liquid egg is safe to consume for a period of at least 4 weeks after treatment in accordance with the present invention and more often 10 to 12 weeks after treatment, or longer. "Greater storage stability" means that the pasteurized liquid egg has a longer shelf life, refrigerated or otherwise, when compared to liquid egg pasteurized under identical operating conditions in terms of time and temperature, by conventional, non-electrical methods.

Figure 1:
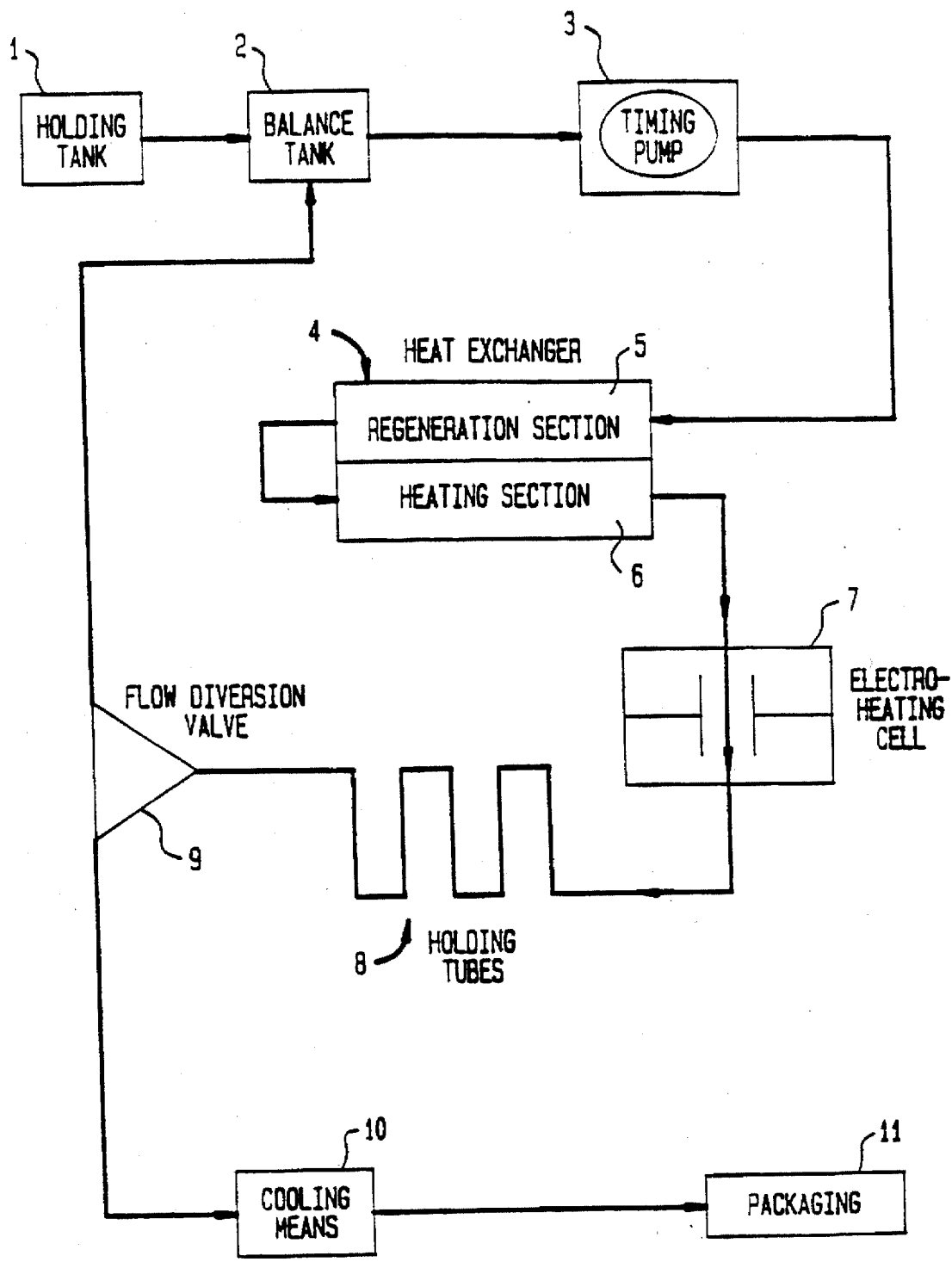
FIG. 1 is a schematic representation of one configuration of an electroheating pasteurization of the present invention.

The methods and apparatus of the present invention will be better understood with reference to the schematic diagram of FIG. 1. For the purposes of illustration only, the discussion with regard to FIG. 1 will involve the use of liquid whole egg. Of course, a device of the same configuration could be used in conjunction with the electroheating and pasteurization of other forms of liquid egg as previously described.

Liquid whole egg is transferred from holding tank 1, usually a refrigerated holding tank, to balance tank 2. Thereafter, the liquid whole egg is pumped through a timing pump 3 which keeps the liquid whole egg moving throughout the entire pasteurization apparatus. The liquid whole egg is then preferably preheated. Any conventional means of heating can be utilized to preheat the liquid egg such as ovens, vats and/or steam infusions systems. In addition, electroheating cells can be used to preheat the liquid egg from refrigerated or room temperature up to about 144° F. or higher.

A particularly preferred method, however, involves the use of a conventional plate heat exchanger 4. Liquid whole egg traveling from timing pump 3 is introduced into plate heat exchanger 4 and specifically into the regeneration section 5 thereof. After passing through the regeneration section 5, the temperature of the liquid whole egg is elevated to from, for example, 35°–40° F. to about 110° F. Thereafter, the liquid whole egg is introduced into heating section 6 of plate heat exchanger 4 where the temperature is further elevated from about 110° F. to between about 120° F. and about 149° F. In a preferred embodiment, preheating temperatures of between about 135° F. and about 149° F., and more preferably, between about 140° F. and 144° F. are used for liquid whole egg.

Of course, it is possible to use a single stage heat exchanger to accomplish the entire preheating step or to use a heat exchanger having more than just two heating and/or regeneration sections to provide a more gradual heating thereto.

Thereafter, the liquid whole egg passes between the two electrodes of an electroheating cell 7 and through the gap defined therebetween. In electroheating cell 7, high frequency electric current which is effective to heat the liquid egg without electrolysis is applied to the liquid egg in such a way so as to avoid detrimental coagulation. For example, liquid whole egg entering electroheating cell 7 from the aforementioned plate heat exchanger 4 would be elevated in temperature from about 140° F. to about 151° F. Preferably, pasteurization temperatures of greater than about 150° F. will be attained for pasteurizing liquid whole egg and more preferably between about 150° F. and about 165° F. Most preferably, pasteurization temperatures of between about 150° F. and 160° F. can be realized.

After being electroheated as disclosed herein, the electroheated liquid whole egg is then passed through holding tubes 8 where it is held for a period of time sufficient to complete pasteurization in accordance with the Federal Regulations. At a flow rate of about 228 pounds of liquid whole egg per minute and with a preheating temperature of 142° F. and an electroheating temperature of 150.8° F., the holding time can be, for example, about 3.54 minutes.

After the liquid whole egg has worked its way through holding tubes 8, it reaches flow diversion valve 9. If the temperature of the liquid egg exiting holding tubes 8 is below a preset value, then it is presumed that pasteurization has not been completed and the liquid egg is channeled back to balance tank 2 through flow diversion valve 9. If, however, the temperature of a liquid egg is at or higher than the preset temperature, the liquid whole egg is allowed to proceed to a means for cooling electroheated liquid egg 10. Thereafter, the cooled pasteurized liquid whole egg may be held in a tank, transported to a tank car, or directly packaged using a packaging device 11.

When cooled in cooling device 10, the pasteurized electroheated liquid egg preferably returns to a refrigerated temperature of between about 35° F. and 40° F.

With the foregoing as an overview, an apparatus useful in accordance with the methods of the present invention will be better understood. The use of a refrigerated holding tank 1 is conventional in the industry for holding both processed and unprocessed liquid egg products. It is of course not essential that a holding tank be utilized in accordance with the present invention. Specifically, liquid egg can be introduced into a pasteurizer from any source such as a tank car, an egg breaking line or the like. Similarly, balance tank 2 and timing pump 3 are conventional in the pasteurization of liquid egg and, indeed, in use in connection with other liquid foods. Their substitution with known equivalents is acceptable as is their complete omission, depending upon the particular needs of the pasteurization apparatus used.

Plate heat exchanger 4, as discussed previously, can include a preheating section or regeneration section 5 and a heating section 6. It is not, however, limited thereto. The plate heat exchanger 4 may also include, in addition thereto, sections which will cool and/or refrigerate liquid egg when passed therethrough. It is also possible that a single chamber heater or heat exchanger be used wherein the temperature of the liquid egg is elevated from, for example, about 40° F. to about 140° F. Other devices as previously discussed can also be used for preheating.

Figure 2:
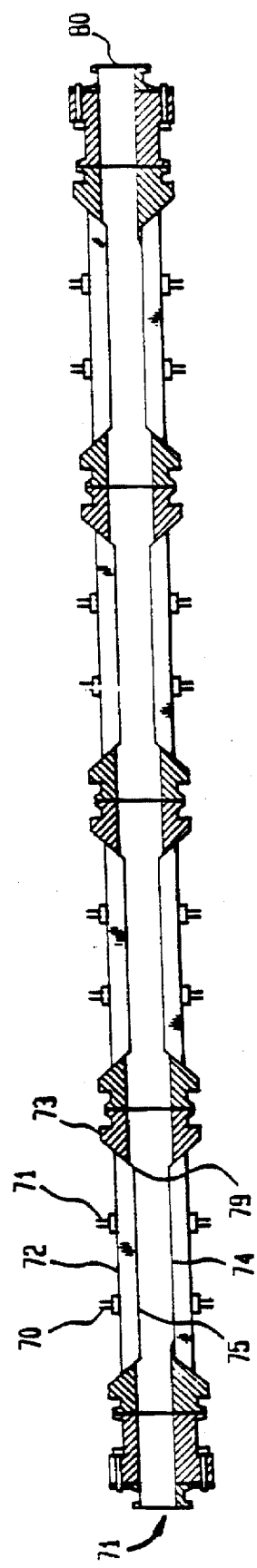
FIG. 2 is a top plan view of an electroheating cell in accordance with the present invention.
Figure 3:
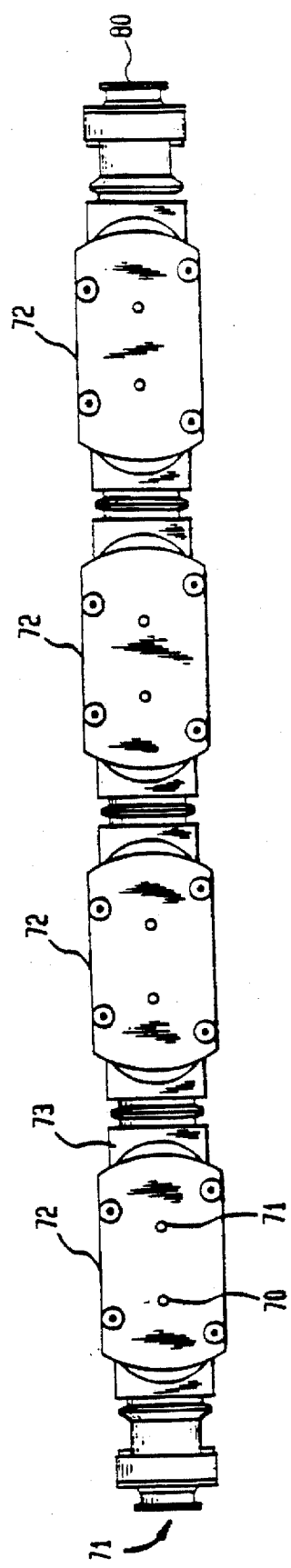
FIG. 3 is a cross-sectional side view of the electroheating cell of FIG. 2 wherein the electrodes have rounded edges.
Figure 4:
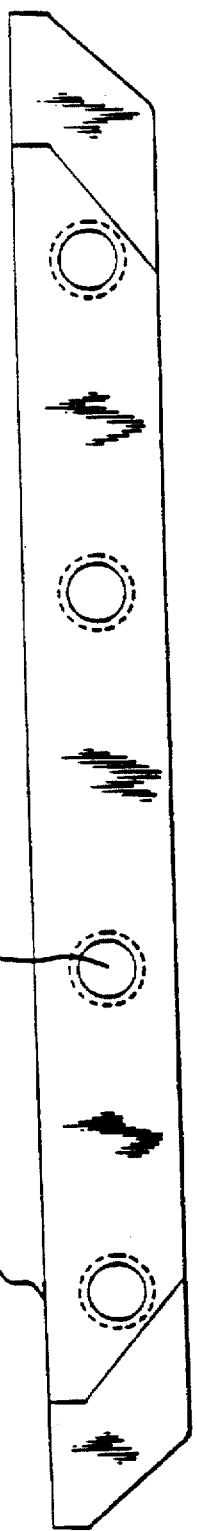
FIG. 4 is a cross-sectional side view of an electrode.
Figure 6:
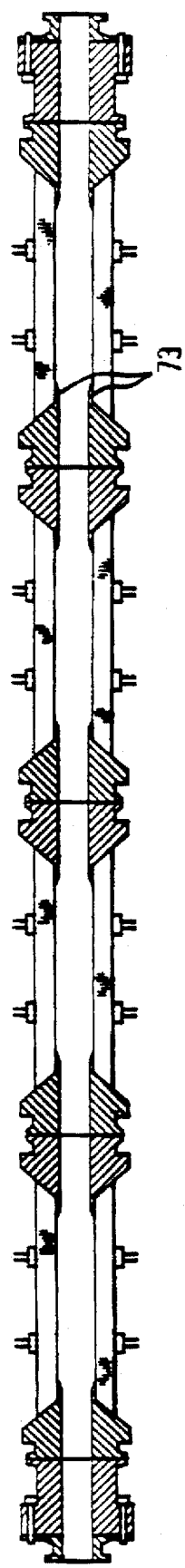
FIG. 6 is a cross-sectional side view of an electroheating cell in which the edges of said electrodes are embedded or encased in insulating material.

Electroheating cell 7 includes an inlet 71 and at least one pair of electrodes 72 spaced apart from one another defining a gap 74. It is through this gap 74 that the liquid egg being pasteurized in accordance with the present invention passes. The electrodes 72 are, in one embodiment, generally disposed such that their egg engaging surfaces 75 are substantially parallel to one another. It is particularly preferred that the egg engaging surfaces 75 of electrodes 72 are generally rectangular in shape, however, other shapes for both electrodes 72 and egg engaging surfaces 75 are also acceptable. Regardless of shape, however, the cell 7 should be designed and the electrodes 72 placed in such a way that the sharp edges 79 of the electrodes 72, if any, do not come in contact with the liquid egg being pasteurized, directly. There are many ways to effectively isolate or eliminate the exposed sharp edges 79 of electrodes 72 so that they do not come into contact with the liquid egg being pasteurized. One way, as illustrated in FIGS. 2–4 is to provide electrodes 72 having rounded edges 79. The edges 79 could also be eliminated by a gradual taper in the electrode surface. It is preferred, however, that the edges 79 of the electrodes 72 be encased in a suitable insulating material 73 as illustrated in FIG. 6.

The insulating material 73 may also be used to assist in spacing opposing pairs of electrodes from one another. The insulating material 73 may be, for example, made of plastics such as Teflon or ceramics. In a preferred embodiment, however, edges 79 of electrode 72 are encased or embedded in "non-tracking plastics" such as DELRIN, a polyacetate homopolymer available from DuPont or CELCON, an acetal copolymer available from Cellanese Corporation. "Non-tracking polymers" are polymers which will prevent the formation of current passages, channels, or tracks of low resistance therethrough. Therefore, these materials can provide an effective insulation in accordance with the present invention.

It is also important that the electrodes 72 and most preferably, the egg engaging surfaces 75, be extremely smooth and difficult to wet or adhere to. Similarly, it is greatly preferred that the flow of egg through electroheating cell 7 be unimpeded. Therefore, relatively straight electroheating cells are preferred.

A source of high frequency electric current (not shown) is operably connected to the electrodes 72. The term "high frequency" in accordance with the present invention is intended to include frequencies which are high enough to prevent the electrolysis of food products and the electrodes when in use and, more preferably, frequencies lying in a range of between approximately 100 Hz and 450 KHz. More preferably, high frequency in accordance with the present invention means the use of currents having a frequency of between about 100 KHz and 450 KHz and more preferably, between about 150 KHz and 450 KHz.

In general, electroheating in accordance with the present invention utilizes electric fields having a strength of 1000 volts/cm or lower and usually, in practice, less than 500 volts/cm. Similarly, relatively low current densities are used. In fact, current densities below 6 amps/cm$^2$ are utilized more preferably current densities with less than 3 amps/cm$^2$ are used. It is most preferred, however, that current densities below about 1 amp/cm$^2$ be used.

The power supply or source of high frequency electric current should be capable of providing a constant flow of energy to the liquid eggs through electrodes 72. In carrying out testing in accordance with the invention, a Westinghouse Pillar Industries, 100 KWatts RF generator was used. The generator was capable of operation at 100 KHz to 450 KHz and is rated at 200 KVA input from a 60 Hz line using 480 volts. The RF generator was operated at a frequency of about 170 KHz and 38 KWatts.

The present inventors have found that in the pasteurization of liquid egg by electroheating in accordance with the present invention, it is important that a uniform current density be used. It is therefore preferable that steps be taken to eliminate the possibility of current density fluctuations. Steps which may or may not be necessary depending on the dictates of a particular system include: the use of a highly stabilized, high frequency energy generators; the use of very smooth electrodes which discourage the adherence of liquid egg thereto during electroheating; the occlusion of the metal edges of plate electrodes such that the edges do not come in contact with the liquid egg being pasteurized; and limiting the rate of heating in a given electroheating cell.

Without wishing to be bound by a particular theory of operation, it is believed that the edges of plate electrodes are a source of current density non-uniformity. It is believed that much higher current densities are found at the sharp metal edges of plate electrodes and therefore considerably more heat is generated in their region. For that reason, egg passing by an edge will be heated to a greater degree than egg passing through the remainder of the electrical field. Such overheating can cause scorching, coagulation, and/or begin a chain reaction which leads to the fouling of the pasteurizer. There are similar phenomena which are thought to occur when egg begins to adhere to the egg engaging surface 75 of electrodes 72.

The size and spacing of the electrodes 72 and the power output of the source of high frequency electric current or power supply used in accordance with the present invention are also of concern. Electrodes 72 must be of sufficient size to allow for the convenient processing of a sufficient quantity of liquid egg. They must also be of sufficient size to allow for the heating of liquid egg at current densities which are sufficient to achieve the desired level of heating without detrimental coagulation. Detrimental coagulation includes caking on the electrodes, creation of too viscous an egg product, the appearance of congealed clumps dispersed throughout the process of liquid egg, and/or the complete fouling of the pasteurizer.

Of course, the actual size of the electrodes 72 can vary widely depending on the frequency of the power used, the amount of power which will be introduced across the electrodes 72 in a given period of time, the speed with which the liquid egg is to be heated, and the differential in temperature which is to be obtained by electroheating. When very low current densities are used, the electrodes 72 may need to be rather lengthy to achieve large temperature increases. On the other hand, if heating is to be extremely rapid and relatively high current densities are used, relatively small electrodes 72 must be used.

As illustrated in FIGS. 2, 3 and 6, it is also possible to use a plurality of opposed pairs of electrodes 72, hooked in series, or in parallel instead of a single pair of electrodes. It is also possible that different pairs of electrodes can be operated at different frequencies. In this way it may be possible to impart an even greater degree of microbial kill.

In a particularly preferred embodiment, the electrodes 72 in accordance with the present invention are cooled to continuously dissipate heat received by being in contact with the electroheated liquid egg. Cooling of the electrodes 72 can be accomplished in any manner, such as, for example, passing tap water over the reverse side of or through the electrodes. The latter is illustrated in FIG. 4 where channels 78 are used to carry a cooling fluid through the electrodes 72. The cooling fluid is recycled and is introduced into electrodes 72 through inlets and out again through outlets (not shown). Other cooling methods include chilled water, glycol solutions, air and the like.

If particularly high temperatures are to be utilized in accordance with the practice of the present invention such as, for example, 180° F., it may be necessary to more rapidly heat the liquid egg so as to avoid detrimental coagulation. In addition to rapid heating, under such circumstances, it will be necessary that the holding time used to hold the liquid egg at an elevated temperature be lessened and that the onset of cooling be hastened. It is necessary in these cases to use greater current densities in order to raise the temperature of the liquid egg more rapidly. Electrodes would therefore be relatively smaller allowing the passage of more watts of power through a smaller space in the same amount of time.

The degree of preheating is dictated by the various economies of energy utilization. Generally, however, because the heat imparted to liquid egg in plate heat exchangers, for example, is recoverable and can be used in cooling liquid egg, it is often advisable to preheat the liquid egg to as high a temperature as feasible. For liquid egg white, preheating temperatures be as high as about 134° F. Preheating temperatures of about 125° F. may be used, if peroxide is added to the liquid egg white. The liquid egg yolk, preheating temperatures of about 142° are preferred. However, preheating temperatures in excess thereof are also acceptable. The liquid whole egg, preheating temperatures may range as high as about 149° F. Preferably, however, preheating imparts a temperature of between about 140° and about 144° F., or lower. Conventional downstream processing including approximately a 3.5 minute holding time have been assumed.

Similarly, and assuming that the liquid egg being treated in electroheating cell 7 is to be processed, and more importantly, held for an extended period of time (between about 1 and about 5 minutes) than the maximum pasteurization temperatures for liquid egg white, with or without peroxide is about 137° F. The maximum pasteurization temperature for liquid egg white can be elevated as high as about 150° F. if functionality, emulsification properties, and the like are not important. Liquid egg yolk may be elevated to a temperature of about 157° F. and liquid whole egg may be heated to a temperature of between about 153° and about 155° F.

Of course, and as discussed elsewhere herein, electroheating in accordance with the present invention allows for a more rapid temperature change than possible through, for example, a plate heat exchanger. Therefore, it is possible to reach much higher pasteurization temperatures than otherwise possible. When such temperatures are obtained, a reduced holding time and more rapid cooling may be needed to avoid detrimental coagulation. Nonetheless, through the practice of the present invention, it is possible to pasteurize liquid egg at temperatures well above 150° F. and in fact up to at least about 180° F., or higher.

As suggested above, in a preferred embodiment electroheating is accomplished by elevating the temperature of the liquid egg in electroheating cell 7 at a rate of about 36° F./sec. or less. Of course, some rate of temperature change, i.e. greater than a zero change temperature is utilized. It is particularly preferred however, that the temperature of the liquid egg be elevated as rapidly as possible. Thus, electroheating is preferably conducted at a rate of between about 10° F./sec. through about 18° F./sec.

Each individual electroheating cell may be structurally and energetically different. A particular electroheating cell, for example, may under certain conditions, be capable of pasteurizing liquid whole egg at a rate of about 10° F. per second while the same operating conditions in a different electroheating cell will produce a temperature change as rapid, for example, for 40° F. per second. At that rate of temperature change the latter electroheating cell may be plagued by arcing, detrimental coagulation, and/or caking. In the former electroheating cell, however, pasteurized liquid egg having the advantageous properties described herein will results without incident. Of course, the former electroheating cell is incapable, under these operating parameters, of operating as efficiently in terms of throughput as the latter electroheating cell. Furthermore, to obtain particularly high temperatures, it may be necessary, or even critical to limit the thermal exposure of the liquid egg to very brief periods of time, for example, less than about 1 second. Under such circumstances, the former electroheating cell will not provide acceptable results.

It is not practicable to provide optimal operating voltages, electrode sizes and degrees of separation and the like for every electroheating cell because of the variability of the design of electroheating cells. However, and without consideration of the specifics of the electroheating cell, if temperature changes are maintained approximately within the ranges prescribed herein, successful processing, particularly on large scale long-term basis should result.

Upon exiting electroheating cell 7 through outlet 80, the electroheated liquid egg passes through holding tubes 8. The length of holding tubes 8 and the flow rate of the liquid egg is determinative of the amount of time at which the liquid egg remains in holding tubes 8. Holding tubes 8 maintain the liquid egg at or close to the temperature obtained during electroheating in electroheating cell 7. During conventional pasteurization at conventional temperatures, holding times of between 2.5 and 5 minutes are standard practice.

However, as the temperature of the liquid egg increases, it may be necessary to shorten the amount of holding time so as to avoid detrimental coagulation which may result from maintaining liquid egg at a specific elevated temperature for too long. When egg is heated to a temperature of, for example, about 180° F., detrimental coagulation may begin in a matter of a fraction of a second. The holding time in such cases may be little more than the time necessary to transfer the liquid egg from electroheating cell 7 to a cooling means 10. Holding times of as little as one second, or less, may be efficacious.

When the temperatures used in accordance with the present invention are, for example, below 160° F., however, it may be necessary for a more extensive holding period to be utilized. In such cases, it may be necessary to employ a flow diversion valve 9 which insures that liquid egg exiting the holding tubes has been maintained at a suitable temperature for a period of time long enough to insure pasteurization. Of course, pasteurization is confirmed separately by microbiologic and other quality control methodologies.

If liquid egg flowing from holding tubes 8 is below a preset temperature, flow diversion valve 9 operates to divert the liquid egg back to balance tank 2 where it reenters the pasteurizer to be repasteurized. If the temperature is at or above the preset temperature, however, flow diversion valve 9 allows for the liquid egg to continue in the pasteurization process.

After heating, the liquid egg must be cooled certainly liquid egg cannot be maintained at elevated temperatures of above 140° F. indefinitely. The higher the temperature used, the more quickly cooling needs to begin. If temperatures below about 160° F. and more preferably below 155° F. are utilized, it may be possible to employ a conventional plate heat exchanger as the means for receiving and cooling the electroheated liquid egg 10. In fact, these cooling sections may be the cooling sections of plate heat exchanger 4 previously discussed. Liquid egg passing therethrough will pass through one or more sections where it will be cooled from its pasteurization temperature to an intermediate temperature. Then, the liquid egg will be transferred to a refrigeration section of the heat exchanger and cooled to a refrigeration temperature of between about 35° F. and about 40° F. Any other form of cooling may be used so long as it provides sufficiently rapid cooling to insure that no detrimental coagulation occurs.

When higher temperatures are used, it is important that cooling begin rapidly and be accomplished rapidly such that the liquid egg does not remain at elevated temperatures (over 140° F.) for a time sufficient for a significant level detrimental coagulation to develop. When, for example, temperatures in a range of 170° F. to 180° F. are used, it may be necessary to begin cooling and achieve a significant degree of cooling in fractions of a second. The sooner cooling is accomplished, the less detrimental coagulation will result. To accomplish this, a particularly preferred means for receiving and cooling the electroheated liquid egg 10 has been developed which essentially mixes the hot electroheated pasteurized liquid egg and already pasteurized cold liquid egg in a sufficient ratio to insure rapid cooling thereof.

Figure 5:
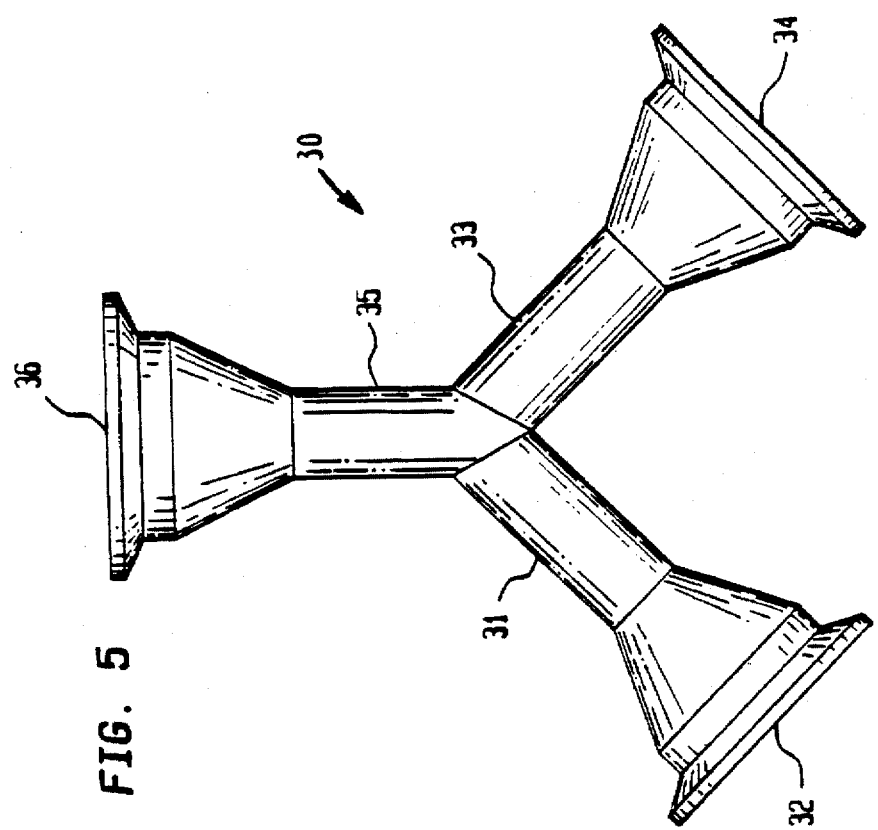
FIG. 5 is a plan view of a cooling device in accordance with the present invention.

This particularly preferred apparatus for cooling the liquid egg is illustrated in FIG. 5 and includes a generally "Y"-shaped device 30 having a first conduit 31 for conveying a stream of hot electroheated liquid egg and a second conduit 33 for conveying a stream of cold, pasteurized liquid egg. These two streams of liquid egg are brought together in a mixing chamber 35 such that they are intimately and quickly intermixed. The rapidity and degree of cooling obtained using such a device is a function of the ratio of hot and cold egg introduced into the mixing chamber, the respective temperatures of the streams, and the rate of combination. Hot electroheated liquid egg is introduced into first conduit 31 through a first inlet 32 and cold pasteurized liquid egg is introduced into second conduit 33 through second inlet 34. Cooled liquid egg exits cooling device 30 and mixing chamber 35 through outlet 36.

In a particularly preferred embodiment, initial cooling is accomplished by the use of device 30 just described. Additional cooling may, however, be obtained by the use of a secondary cooling means for further cooling the liquid egg. This may be a conventional plate heat exchanger as previously described. After cooling by device 30, a plate heat exchanger, a combination of both, or some other device, a certain fraction of the now cooled egg intermixed with the cold egg can be recirculated back to the second conduit 33 to provide for the rapid cooling of additional hot electroheated liquid egg.

Liquid egg resulting from the practice of the present invention has several distinct advantages over liquid egg which is conventionally pasteurized. For reasons which are not completely known, liquid egg prepared in accordance with the present invention has a higher degree of microbial kill then could otherwise be expected without the use of elaborate electrocution apparatus such as disclosed in the U.S. Pat. No. '472 patent. As described further herein, comparative testing has demonstrated that less re-growth of bacteria occurs in liquid egg in accordance with the present invention, even when the liquid egg is maintained at room temperature. In fact, the level of bacterial concentration in refrigerated liquid egg pasteurized by electroheating actually slightly decreased over a period of days after processing. Thus it is possible, by the practice of the present invention, to provide liquid egg products of greater shelf stability and dramatically extended refrigerated shelf life.

It is also apparent that because of the more effective kill obtained by electroheating in accordance with the present invention, less care needs to be exhibited in the storage of the liquid egg. This is particularly important because refrigeration of the liquid egg in, for example, supermarkets, is not always consistent. Packages containing pasteurized liquid egg are sometimes at the back of a refrigerated shelf where the temperature may be in the range of 35° F. to 40° F. By the same token, liquid egg may be placed at the front of the shelf exposed to the open air where the temperature may be as high as 50° F. The problems of inconsistent refrigeration are further compounded by normal store practice of rotating stocks so that the oldest stock is at the front of the display to promote its rapid sale.

Not surprisingly, the degree of microbial kill and the degree of the liquid egg's resistance to re-growth of microorganisms is somewhat dependent upon the temperature and time parameters under which pasteurization is undertaken. It should be readily apparent, however, that temperature in accordance with the present invention directly translates to the amount of power input through the liquid egg in a given period of time. The higher the level of heat, the greater the amount of electric current passing through the liquid egg. It can therefore be expected that with higher temperatures and higher power level exposures, greater degrees of pasteurization can be realized.

The eggs prepared in accordance with the present invention are also more likely to retain a greater degree of functionality when compared to other liquid egg. Electroheating as disclosed herein provides a greater degree of microbial kill than otherwise attainable through the use of conventional non-electrically based technology. It is therefore possible to pasteurize using an electroheating device at lower temperatures while still attaining the same or better level of kill as would otherwise be expected from the use of, for example, plate heat exchangers. Because the liquid egg is more "gently" pasteurized, less denaturation and coagulation should result with less attendant loss of functionality.

Another advantage of electroheating for the pasteurization of liquid egg is that pasteurization can be undertaken even when the egg is intermixed with other food stuffs. As for example, raw liquid whole egg could be mixed with such ingredients as chopped ham, onion, pepper, and the like and then pasteurized by electroheating. It is therefore possible, through the practice of the present invention to prepare, in raw form, all of the necessary ingredients for a western omelet. Then the ingredients and the liquid egg are electroheated such that the liquid egg is pasteurized. This can be followed by packaging to produce an extended refrigerated self life liquid omelet mix.

The foregoing will be better understood with reference to the following examples. These examples are for the purposes of illustration. They are not to be considered limiting as to the scope and nature of the present invention.

EXAMPLE 1

A cell having electrodes of about 10" by 3.5" were constructed with a separation of about 1". Liquid whole egg with citric acid (0.12–0.17%) was filled into the gap between the electrodes to a height of about 3". An AC current having a frequency of 10 KHz, 600 volts, and 330 amps was applied to the liquid egg. This yielded a field strength of about 336 volts/cm$^2$ and a current density of about 1.7 amps/cm$^2$.

This energy was initially applied for 0.2 seconds. Thereafter, the egg temperature was measured and the quality of the egg evaluated. After 4 such 0.2 second applications, coagulation began. After the fifth application, a solid mass of cooked egg resulted. This initial test showed that electrical energy in accordance with the present invention could be effective for electroheating liquid egg. However, when this technique was initially applied to a continuous liquid egg pasteurization process, the results were not as promising. Arcing, caking, undesirable coagulation and odor resulted.

EXAMPLE 2

Liquid whole egg was electroheated in a continuous pasteurizer as illustrated in FIG. 1. However, electroheating was conducted using an electroheating cell which was disposed after the holding tubes. The electroheating cell used a pair of plate electrodes 7"×1.5" with a 0.5" separation. The electrodes had small securing teeth around their periphery which were embedded into the insulation. First, saline was run through the system at 110 amps, and 152 volts with a field strength of about 178 volts/cm$^2$ and a current density of about 1.57 amps/cm$^2$. A 10 KHz power source was used. A change in temperature of 33° F. from 147° F. to 180° F. was realized. However, some arcing was observed at the higher rate of temperature change. After a half an hour, liquid egg was processed through the same apparatus. The current used was 72 amps, the voltage was 492 volts, the frequency was 9.4 KHz and 34 KWatts were used. The temperature change achieved was about 17° F. from about 145° F. to 162° F. However, arcing, coagulation and odor began after about 3 minutes.

This illustrates the problems realized when electroheating in accordance with the present invention was taken from the static, bench test to a continuous in-line egg processing apparatus.

EXAMPLE 3

In an attempt to mitigate the problems realized in Example 2, a 170 KHz power supply was used with the cell described in Example 2. When running saline, no problems were observed. However, immediate arcing, coagulation and odor resulted when the processing line was switched to liquid whole egg. It is believed that this test indicates that arcing and coagulation are problems associated with not only the design of the electrodes, but the inherent properties of liquid egg.

EXAMPLE 4

Liquid whole egg with citric acid to protect color during frying was treated in an apparatus configured as illustrated in FIG. 1. Cooling means 10 were the various cooling sections of a conventional plate heat exchanger. Liquid egg entering regeneration section 5 of plate heat exchanger 4 entered at a temperature of about 40° F. and left at a temperature of about 110° F. The liquid egg was then transferred to heating section 6 of plate heat exchanger 5 where its temperature was elevated to approximately 142° F. Thereafter, the liquid egg was transported to an electroheating cell 7 as illustrated in FIG. 2 where 31 kw per hour were applied to the liquid egg. The flow rate through the electrodes was about 228 lbs. per minute. The electroheating cell employed four sets of electrodes, each of which had a length of 18.5 cm, a width of 3.4 cm and a separation of 3.4 cm. The total surface area of the electrodes was approximately 250 cm$^2$. While in electroheating cell 7, the liquid egg was subjected to high frequency current at approximately 170 KHz, 210 amps, 156 volts and a field strength of about 64 volts/cm.

After electroheating, the liquid egg had attained a temperature of 66° C. (150.8° F.). The liquid egg was then transported to holding tubes 8 and was held for approximately 3.54 minutes. The temperature of the liquid egg at the end of holding tubes 8 was about 150.8° F. The liquid egg was then cooled using a conventional plate heat exchanger and packaged in gable top packages in a cherry-burrell model EQ-3 packager.

Samples of the material prepared in accordance herewith were held at 38° F. and tested for total plate count over a period of 14 days. The results were reported in Table 1.

TABLE 1

|  | | Sample No. | | | |
| --- | --- | --- | --- | --- | --- |
| Date | | 1 | 2 | 3 | 4 |
| Treatment | + 2 days | 50 | 60 | 100 | — |
| | + 6 days | 60 | 60 | 70 | 60 |
| | + 14 days | 40 | | | |
| | + 21 days | 100 | | | |

The results showed that the overall total plate count for liquid egg electroheated in accordance with the present invention was excellent in terms of microbial kill and lower than is generally realized from similar treatments using, for example, plate heat exchangers. The total plate count decreased, albeit slightly, over a 14 day period following treatment.

Other samples of material were held at 70° F. for three days. The pH remained at 6.8, the color remained typical of eggs stored at 38° F., the viscosity remained typical of eggs stored at 38° F. and the odor remained typical of eggs stored at 38° F. A control held under the same conditions exhibited a typical odor of eggs stored at 38° F. However, the viscosity of the liquid egg changed to a pudding-like viscosity, the pH dropped to between about 5.3 and about 5.6, and the color became bright yellow. This indicates spoilage and a generally higher level of active bacteria present in the liquid egg.

Finally, liquid egg processed in accordance with this example was fried at 300° F. on an open griddle. The egg retained a typical flavor and texture. On average, the total plate count for liquid whole egg treated by, for example, a plate heat exchanger at 150° F. would be in the range of between about 100 and about 500. However, lower plate counts have been observed from time to time.

EXAMPLE 5

Liquid whole egg with citric acid was processed as described in Example 4. However, the temperature of preheating through plate heat exchanger 4 was elevated from 142° F. to about 148° F. The liquid egg attained a temperature of 69° C. (156.2° F.) during electroheating in electroheating cell 7. After being held for 3.54 minutes, the temperature of the liquid egg was 155.3° F.

Liquid egg prepared in accordance with this example is held at 38° F. for a period of time and samples of this material were tested for total plate count. The results are reported below in Table 2.

TABLE 2

|  | | Sample No. | | | |
| --- | --- | --- | --- | --- | --- |
| Date | | 1 | 2 | 3 | 4 |
| Treatment date | + 2 days | 100 | 50 | 100 | — |
| | + 6 days | 60 | 70 | 80 | 70 |
| | + 14 days | 40 | | | |
| | + 21 days | 200 | | | |

Again, the results obtained in accordance with this test are reflective of superior levels of bacterial kill. In addition, it was again observed that the total plate count diminished somewhat as long as 14 days after pasteurization was effectuated.

Samples of liquid egg prepared in accordance with this example were held at 70° F. for three days. The pH remained at 6.8, the color remained typical of eggs stored at 38° F., the viscosity remained typical of eggs stored at 38° F. and the odor remained typical of eggs stored at 38° F. The results of the control were identical to those described with reference to Example 3. These observations, taken in accordance with the total plate count indicate the superior nature and the efficacy of electroheating as a technique for pasteurizing and for imparting extended storage stability to liquid egg.

Egg prepared in accordance with this example was fried on an open griddle at 300° F. The egg retained typical flavor and texture.

EXAMPLE 6

Liquid whole egg was processed as described above in Examples 4 and 5. The temperature of the liquid egg flowing out of plate heat exchanger 4 was 142° F. and the temperature attained in electroheating was approximately between 69° C. and 70° C. for a brief period of time. Because of instability in the coils of the power supply used, and the rapid rate at which power levels were increased, arcing occurred at 70° C. and detrimental coagulation began necessitating the shutdown of the system.

EXAMPLE 7

Liquid whole egg without additives was electroheated to a temperature of about 152° F. and held at that temperature for approximately 3.6 minutes. Treatment was as described in Examples 4 and 5. Four samples were taken two days after pasteurization and initial total plate counts were run. Sample 1 showed a total plate count of 20, sample 2 showed a total plate count of 30, sample 3 showed a total plate count of 20, and sample 4 showed a total plate count of 20. This is extremely low by comparison to pasteurization by, for example, plate heat exchangers under these conditions. After 14 days, the total plate count for a single sample taken was 40.

Whole egg pasteurized in accordance with this example was maintained at 70° F. for three days. The pH of the electroheated liquid whole egg remained at 7.3 and the odor, color, and viscosity remained typical of eggs properly stored at 38° F. In contrast, the control showed a pH of between 5.3 and 5.7, the color was bright yellow and the viscosity was elevated to that of pudding. The odor remained acceptable.

EXAMPLE 8

Liquid whole egg with citric acid was pasteurized using the device illustrated in FIG. 1 and in accordance with the procedures generally described in Examples 4 and 5. Temperatures in electroheating cell 7 reached 150° F. About 35,000 lbs. of liquid egg were processed and packaged in a cherry-burrell model EQ-3 packager. The initial total plate count of liquid whole egg taken two days after treatment was 18.

EXAMPLE 9

Liquid egg as described in Example 8 was processed at a temperature of about 151° F. 55,000 lbs. of liquid egg were processed. The initial total plate count resulting was 28.

The principles, preferred embodiments, and modes of operation of the present invention have been described in the foregoing specification. The invention which is intended to be protected herein, however, is not to be construed as limited to the particular embodiments disclosed, since these are to be regarded illustrative rather than restrictive. Variations and changes may be made by others without departing from the spirit and scope of the invention.

We claim:

1. A method of rapidly cooling hot pasteurized liquid egg comprising the steps of intermixing hot pasteurized liquid egg with cold pasteurized liquid egg in a ratio sufficient to lower the temperature of said hot pasteurized liquid egg, said hot and cold pasteurized liquid egg having substantially the same liquid egg components in substantially the same proportions.

2. The method of claim 1 wherein the proportion of cold pasteurized liquid egg and the temperature thereof is selected so as to reduce the temperature of the hot pasteurized liquid egg to below pasteurization temperature.

3. The method of claims 1 or 2 further comprising the step of introducing said intermixed hot pasteurized liquid egg and cold pasteurized liquid egg into a means for secondary cooling and secondarily cooling said mixture to a temperature below 65° F.

* * * * *